Oct. 18, 1938.  W. L. GITTINGS ET AL  2,133,692
LITTER
Filed Feb. 26, 1937
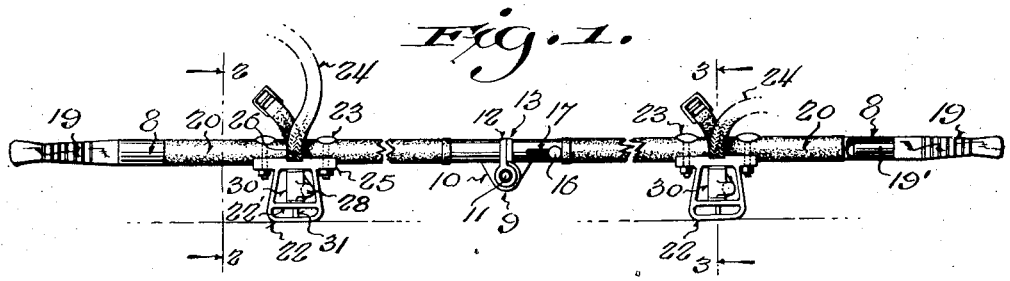
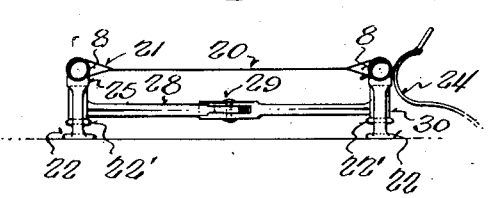
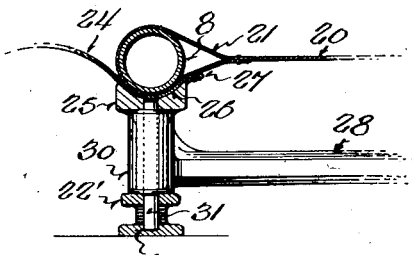
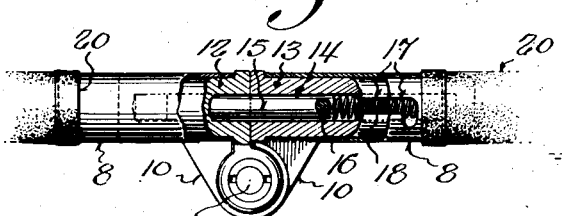
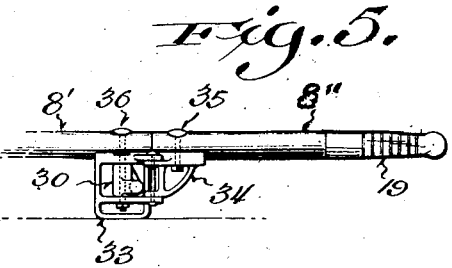
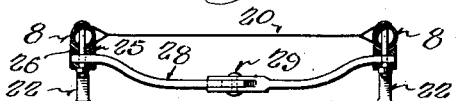
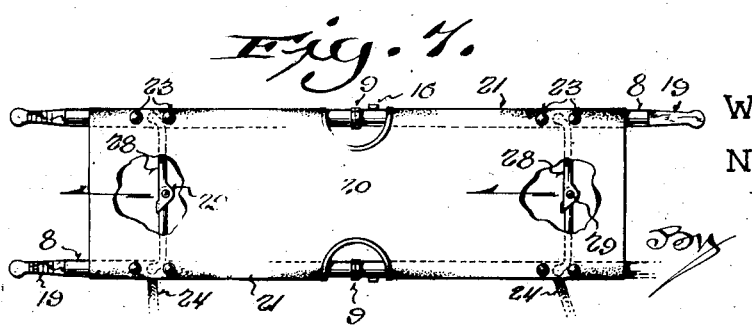
Inventors:
Wm L. Gittings
Newton N. Brown Patented Oct. 18, 1938

2,133,692

UNITED STATES PATENT OFFICE 2,133,692

LITTER

William L. Gittings and Newton N. Brown, Racine, Wis., assignors to Gold Medal Folding Furniture Company, Racine, Wis.

Application February 26, 1937, Serial No. 127,937

3 Claims. (Cl. 5—82)

This invention pertains to litters of the folding type, and has primarily for its object to provide an exceedingly light, compact, and foldable litter, having improved fittings to facilitate assembly and handling, and at the same time furnish maximum comfort for the occupant.

Incidental to the foregoing, a more specific object of the invention resides in the provision of an improved design of transverse braces, constructed to allow maximum stretch of the canvas cover under the weight of the occupant, without contacting the braces, and at the same time maintain the desired compactness of the litter in both extended or collapsed condition.

Another object resides in the provision of a novel form of locking hinge for the side bars of the litter to permit the same to be folded back upon themselves.

A further object is to provide rule jointed braces adapted to break in the same direction, to facilitate collapsing of the litter, and to provide clearance between one another when the side rails are folded upon themselves.

A still further object is to provide a litter with metallic tubular side rails equipped with end hand-grips made of wood, composition, or other thermal insulating material, to eliminate difficulties and discomfort in handling under conditions of extreme cold or heat.

Lastly, it is an object of the invention to provide supports for the side rails of the litter, and attachment of the transverse braces, provided with hinged brackets connected to the end sections of the side rails to provide maximum compactness of the litter when collapsed for storage or portability.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Figure 1 is a side elevation of a litter in extended condition, and embodying certain novel features included in the present invention.

Figure 2 is a transverse section taken on the line 2—2 of Figure 1.

Figure 3 is an enlarged fragmentary section taken on the line 3—3 of Figure 1.

Figure 4 is an enlarged fragmentary elevation of one of the side bar hinges, with parts broken away and in section, to more clearly illustrate structural features.

Figure 5 is a fragmentary elevation of a modified form of foldable side bar and support.

Figure 6 is a transverse section similar to Figure 2, and illustrating a modified form of transverse brace, and Figure 7 is a reduced plan view of the litter illustrated in Figure 1, showing the preferred manner in which the transverse braces are broken.

Referring now more particularly to the accompanying drawing, that form of the invention illustrated in Figure 1 comprises a pair of sectional side bars indicated by the numeral 8, and provided with hinges 9 intermediate their ends, to allow the same to be folded back upon themselves.

As best shown in Figure 4, the hinges 9 comprise a pair of wings 10 connected by a pintle 11, and provided with alined plugs 12 and 13, respectively, which are secured within the ends of the adjacent tubular sections of the side rails 8. The plug 13 is provided with a central orifice 14 in which a plunger 15 is slidably mounted. A thumb lug 16 is carried by the plunger 15, and extends through alined bayonet slots 17 formed in both the lug 13 and tubular side bar 8, thus allowing the plunger to be projected into the adjacent plug 12, to firmly lock the sections together, or retracted, to allow collapsing of the sections. A coil spring 18 positioned within the orifice 14 serves to urge the plunger 15 to projected position.

Obviously, use of tubular metallic side bars provides for maximum strength and lightness of the litter. However, in actual use of the metallic side rails, a serious objection has arisen in that when the litter is used under conditions of either extreme cold or heat, handling of the litter causes serious discomfort, in that excessive cold causes the hands to stick to the rails, and, if overheated, the same are hard to handle. Also, in damp or wet weather, the rails become slippery, and it is difficult to maintain a secure grip upon the same. Therefore, one of the features of the present invention resides in the provision of hand-grips 19 formed of wood, composition, or other thermal insulating material, which is a poor conductor of cold or heat. The grips 19 are provided with lugs 19' inserted into the ends of the side bars, and secured thereto in any suitable manner.

The customary canvas or fabric cover 20 employed is provided with longitudinal hems 21 for reception of the side bars 8, and secured to the side bar sections over the canvas 20 adjacent their ends are the usual supports 22. Bolts 23 passing through the cover and side bars serve to attach the supports 22, and also secure the canvas hems against longitudinal shifting on the side bars.

For the purpose of securing the parts of the litter together in folded position, suitable tie straps 24 are provided and secured against detachment when not in use by passing their ends between the side rails and saddle 25 formed on the supports 22, the inner face of the saddle being provided with an arcuate groove 26 for reception of the strap. A hem 27 formed on the end of the strap prevents its withdrawal from the support.

Pivotally connected to each pair of supports 22 is a transverse brace 28 provided with an intermediate rule joint 29, as best shown in Figures 2 and 3. The pivotal ends of the braces are provided with elongated hubs 30 disposed between the saddles 25 and the webs 22' carried by the supports. A loose pintle 31, passing through the saddle 25, hub 30, and web 22', rests in a recess 32 formed in the foot of the support, as best shown in Figure 3, and, obviously, when the support is attached to the litter, the pintle is held in assembled position without the aid of fastening means, thus reducing both cost of manufacture and assembly. Here particular attention is directed to the fact that the transverse braces 28 extend from the elongated hubs 30 adjacent their lower ends, thus serving to space the braces a sufficient distance below the canvas 20 to permit the same to stretch downwardly under the weight of an occupant, without contact with the braces, thus eliminating discomfort and more serious injury to the occupant.

While that form of the invention illustrated in Figure 3 is preferred, due to its rigidity, similar results can be obtained by elimination of the hubs 30, as illustrated in Figure 6, and dropping the intermediate portions of the braces downwardly to provide the desired clearance below the canvas.

As best shown in Figure 7, the rule jointed transverse braces 28 are positioned to break in the same direction, as indicated by the arrows. This materially facilitates extending and collapsing of the litter, in that the same can be accomplished by the operator from one end, whereas were the braces to break in opposite directions, either the litter must be reversed to manipulate each brace, or the operator must move from one end of the litter to the other. This feature is important, in that in actual use it is customary to break the braces with the litter in a vertical position, and, as explained, the present arrangement allows the lower brace to be broken downwardly with the foot and the upper brace pulled downwardly with the hand. Were the upper brace to work in an opposite direction, the litter is of such length as to make it impossible for the average height person to reach or exert sufficient leverage to break the same upwardly. Incidental to the foregoing, an additional advantage resides in the fact that where the side bars are broken or hinged centrally of their ends to provide for folding back upon themselves, breaking the braces in both directions causes them to clear one another when the litter is folded, thus providing a more compact bundle for storage or transportation.

Figure 5 illustrates a modification of the present invention, in that instead of providing for a central joint in each of the side bars 8, each bar comprises an intermediate section 8', and end sections 8''. In this structure the supports 33 secured to the sections 8' are provided with hinged brackets 34 connected to the end sections 8'' by means of the bolts 35. Bolts 36 passing through the sections 8' serve to attach the cover, the supports 33, and transverse braces 25 in assembled position.

From the foregoing explanation, considered in connection with the accompanying drawing, it will be readily seen that an exceedingly light, compact, and durable litter has been provided, which because of the improved fittings can be produced and assembled at a minimum cost. At the same time, maximum comfort is provided for the occupant, and collapsing and handling of the litter are materially facilitated under all conditions.

We claim:

1. A folding litter comprising a fabric cover, a pair of tubular metal side bars carried by the longitudinal edges of the cover, supports secured to said side bars adjacent their ends, hinged transverse braces each connecting an end set of supports, a loose pintle carried by said supports pivotally connecting the ends of said braces, said pintles being held against longitudinal displacement by said side bars.

2. A collapsible folding litter comprising a fabric cover, a pair of side bars carried by the longitudinal edges of the cover, supports secured to said side bars adjacent their ends and rule-jointed, transverse braces connecting each end set of supports, the central rule joint of both braces breaking in the same direction.

3. A folding litter comprising a fabric cover, a pair of side bars carried by the longitudinal edges of said cover, each side bar being provided with a hinge joint to permit the sections to be folded back upon themselves, supports secured to said side bars adjacent their ends, and hinged transverse braces pivotally secured to said supports, said braces being provided with central rule joints adapted to break in the same direction.

WILLIAM L. GITTINGS.
NEWTON N. BROWN.